United States Patent [19]

Hughes

[11] Patent Number: 4,614,463
[45] Date of Patent: Sep. 30, 1986

[54] CUTTER HAVING REMOVABLE CUTTING BLADES

[76] Inventor: Chesley P. Hughes, 2124 Hilton Dr., P.O. Box 5399-WSB, Gainesville, Ga. 30501

[21] Appl. No.: 774,982

[22] Filed: Sep. 11, 1985

[51] Int. Cl.[4] ............................................. B26D 1/00
[52] U.S. Cl. ...................................... 407/49; 407/62; 144/205; 144/219; 144/230
[58] Field of Search ........................ 407/47, 48, 49, 40, 407/41, 34, 53, 62; 144/230, 205, 218, 220, 221, 227, 208 C, 136 A, 219

[56] References Cited

U.S. PATENT DOCUMENTS

| 794,989 | 7/1905 | Kohler | 144/205 |
| 1,269,378 | 6/1918 | Bunch | 144/230 |
| 1,313,710 | 8/1919 | McKoy | 144/219 |
| 2,521,868 | 9/1950 | Otto | 407/48 |

Primary Examiner—Leonidas Vlachos
Attorney, Agent, or Firm—Patrick F. Henry

[57] ABSTRACT

A cutter body has a plurality of detachable blades mounted in a cutter body plate which extends into a hub that is mounted on a power shaft. Each blade comprises an upper blade edge and a lower blade edge held in place by a block which is removably retained on the cutter body by means of setscrews. Accordingly, it is unnecessary to weld or braze any of the parts in place.

7 Claims, 4 Drawing Figures

CUTTER HAVING REMOVABLE CUTTING BLADES

The field of the invention pertains to rotary cutting assembly for post forming wherein a tungsten carbide cutting blade is clamped in place rather than brazed. The cutter body has a plurality of radial slots in which the individual cutting blades are clamped by means of screws and removable clamping blocks.

Previously tungsten carbide cutting edges were brazed in place in an individual respective top and bottom slot. Brazing is a time consuming process and due to the brittle nature of certain carbide metals the more desirable harder grades cannot be brazed. In addition, the holder or cutter body for the brazed cutting edges cannot be used indefinitely because it wears out from use.

The present arrangement comprises a cutter body which virtually will not wear out, or at least wears a lot longer, and, instead of the separate spaced placement of blade elements which are blazed in place, the present blade elements are each a single plate blade unit which has both the upper curved and outer straight cutting edges. Furthermore, the harder grades of carbide can be used in the present arrangement and since the blades are clamped rather than brazed there is a longer life between sharpening. Also, the cutting edges in the present arrangement are self-locating and no special set-up is required as in the case of brazing. In addition, the present arrangement is quieter than the brazed cutters.

The present arrangement comprises a cutter body which has a circular plate portion and a thickened or enlarged hub portion. There is a shaft opening in the hub and plate with a suitable key way for attachment to a power shaft. The arrangement may be used for post forming. A plurality of arcuately spaced radially extending cutter slots are provided in the hub and plate. A cutter blade is a plate with a curved top cutting edge, a notched gap and an exterior outer cutting edge in straight formation. A mounting and clamping cutter block is inserted with the cutting blade into a respective notch and the entire assembly is held in place by upper and lower set screws which extend through complementary holes formed in the block and blade and screw into tapped openings in the cutter body.

Accordingly, the object and advantages of this invention over the previous brazed arrangement have been set forth above. Briefly restated: there is less expense or capital outlay; the cutting edges are self-locating and no set-up is required; the harder grades of carbide may be used and there is longer life between sharpening.

Briefly described, the cutting body is provided with carbide cutting blades which are clamped in place by special gibs or blocks and locking screws.

Other and further objects and advantages of this invention will become apparent upon reading the following description of a preferred embodiment taken in conjunction with the accompanying drawings, in which.

DESCRIPTION OF A PREFERRED EMBODIMENT

Figure 1:
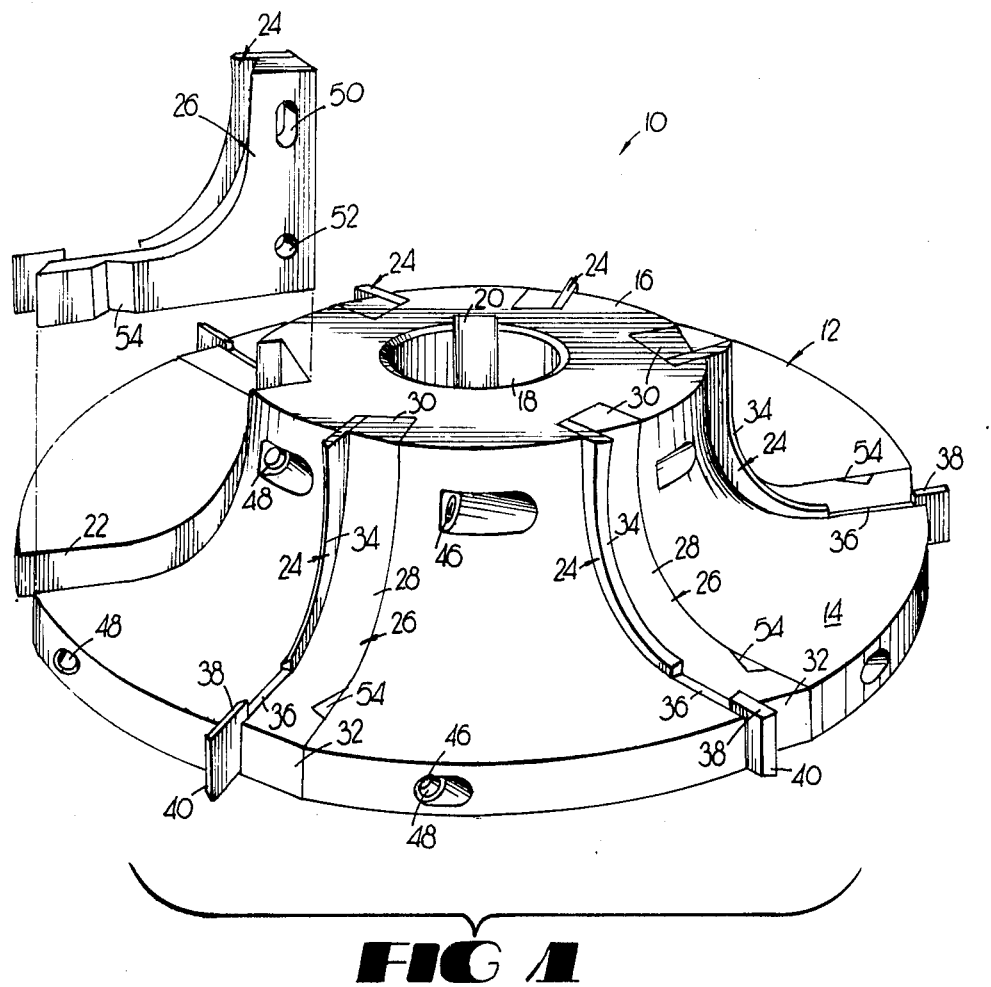
FIG. 1 is a perspective view of the present cutter arrangement with one of the blades and gibs or locking blocks moved out of position.
Figure 2:
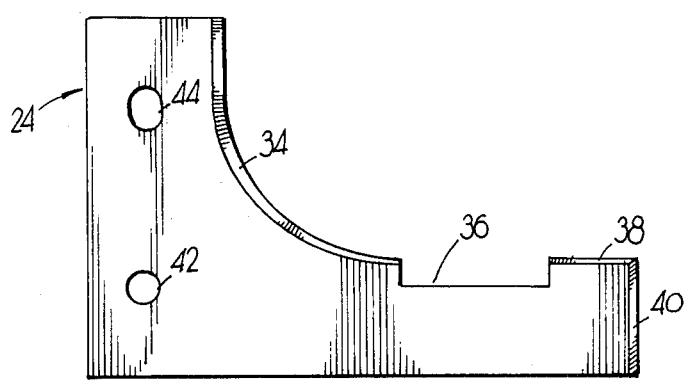
FIG. 2 is an elevation view of the tungsten carbide blade which is inserted and clamped into the assembly shown in FIG. 1.
Figure 3:
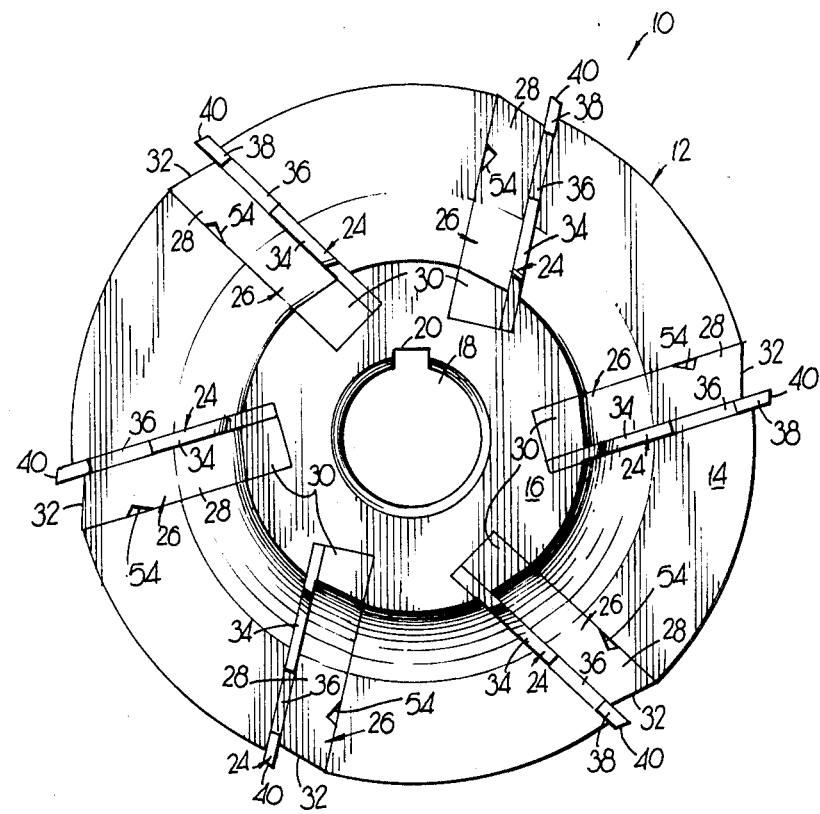
FIG. 3 is a top plan view of the device shown in FIG. 1 with the blades and blocks assembled.
Figure 4:
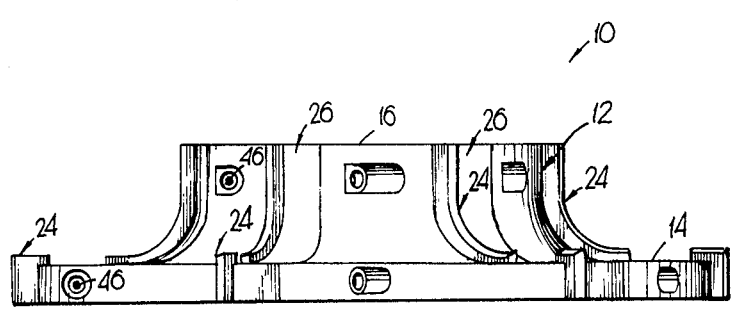
FIG. 4 is an elevation view of the device shown in FIG. 3.

The cutter assembly 10 comprises a cutter body 12 having a plate 14 integrally and uniformly extending into a hub of reduced diameter with comparison to the plate 14 and thickened in the middle so that there is a gradual transition providing a curved portion 16 leading from the top of plate 14 to the top of hub 16. Both the hub and the plate have a common shaft opening therein which has a keyway 20 for the purpose of locking the entire device 10 in place on a movable power shaft for the purpose of metal forming such as in making a metal post of special formation. A plurality of radially extending blade slots 22 are cut or otherwise formed radially at spaced locations into the plate 14 and the hub 16 to provide spaces in which cutting blades 24 are mounted.

Each cutting blade 24 is a plate held in place by a special curved mounting block or gib 26 which has a curved face 28, an angled flat top 30 to fit into the curvature of the circumference of the hub 16 and an angled outer end 32 leading to the end of the cutter blade 24. Each cutting blade 24 is similar in shape to the respective block 26 which holds it in place and each cutting blade 24 has an upper curved cutting edge 34, a gap 36 and an outward projecting straight cutting edge 38 which is formed on the top of the end 40 of each blade 24. Each blade 24 has a circular opening 42 and an elongated opening 44 to receive a respective setscrew 46 mounted in openings 48 and 50 respectively in the hub 16 and the plate 14. Each block 26 also has a corresponding elongated slot 50 and a circular hole 52 matching with the holes 44 and 42 in the blade 24 and the respective screw openings 48, 50 in each of the locations for each of the blades 24 in the hub 16 and the plate 14. Block 26 has a notched or offset portion 54 above the setscrew 46 and the setscrew 46 is actually screwed into a tapped opening in the face of block 26 at the location 54.

Thus, cutting blade 24, block 26 and setscrews 46 are readily assembled to assure the proper positioning and alignment of the respective blade 24 so as to place the cutting edges 34 and 38 in the exact position. This is a substantial advantage over the previous brazed arrangement because of the former difficulty of properly locating and retaining the blades in place while the brazing was being performed and to assure that the blades did not dislodge or fall out of proper position.

While I have shown and described a particular preferred embodiment of this invention this is by way of illustration and there are various alterations, changes, deviations, eliminations, and variations of the preferred embodiment within the scope of my invention as defined only by proper interpretation of the appended claims.

What is claimed:

1. In a cutting arrangement for mounting on a power shaft to be rotated thereby:
   a circular cutter body having an axis of rotation a plate portion and a curved hub portion and a coaxial opening therethrough for mounting on a rotatable shaft,
   a plurality of spaced blade slots extending radially inwardly from the edge of the plate and axially through a portion of the hub, a respective blade assembly removably mounted in a respective blade slot, each blade assembly comprising a cutting blade having a radially curved cutting edge portion and a straight cutting edge portion, and blade retaining means including a mounting block on said cutting body for removably holding said blade in place.

2. The device in claim 1 wherein said blade retaining means comprises screw openings in said hub and screw openings in said plate matching with respective openings in said mounting block and said cutting blade, and screws detachably mounted in openings in said hub and said plate, said screws being threaded into said cutting body for holding each of said cutting blades in place.

3. The device claimed in claim 1 wherein said cutting blade comprises a cutting plate having a rear edge and bottom edge at right angles and the one end of said mounting block being at an angle to conform to the circular shape of said hub at the curved portion and the other end of said block being at an angle leading to the end of said cutting blade and the straight cutting edge thereon whereby said end of said mounting block is inclined and the end of said cutting blade projects beyond the edge of said plate.

4. The device in claim 1 wherein said mounting block has a right angular corner.

5. The device in claim 1 wherein each mounting block has openings corresponding to respective openings in said cutter body, retaining means for operation in said openings to retain said blade in place.

6. The device in claim 1 wherein there is a gap in each blade between the curved portion and straight portion respective cutting edge.

7. The device in claim 2 wherein each block has a notch thereon.

* * * * *